United States Patent
Pauws et al.

(10) Patent No.: US 8,069,036 B2
(45) Date of Patent: Nov. 29, 2011

(54) METHOD AND APPARATUS FOR PROCESSING AUDIO FOR PLAYBACK

(75) Inventors: Steffen Clarence Pauws, Eindhoven (NL); Fabio Vignoli, Eindhoven (NL); Aweke Negash Lemma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 896 days.

(21) Appl. No.: 12/088,008

(22) PCT Filed: Sep. 12, 2006

(86) PCT No.: PCT/IB2006/053230
§ 371 (c)(1),
(2), (4) Date: Mar. 25, 2008

(87) PCT Pub. No.: WO2007/036824
PCT Pub. Date: Apr. 5, 2007

(65) Prior Publication Data
US 2008/0221895 A1    Sep. 11, 2008

(30) Foreign Application Priority Data
Sep. 30, 2005   (EP) ..................... 05109080

(51) Int. Cl.
*G10L 19/14* (2006.01)
*G10L 19/00* (2006.01)
*G10H 3/18* (2006.01)
*H04R 5/00* (2006.01)

(52) U.S. Cl. .............. 704/205; 704/216; 84/600; 381/1
(58) Field of Classification Search ....................... None
See application file for complete search history.

(56) References Cited

U.S. PATENT DOCUMENTS

| 5,679,912 | A  | * | 10/1997 | Asai et al. | 84/609 |
| 6,542,869 | B1 | * | 4/2003  | Foote | 704/500 |
| 6,661,753 | B2 | * | 12/2003 | Inoue et al. | 369/47.15 |
| 7,345,233 | B2 | * | 3/2008  | van Pinxteren et al. | 84/615 |
| 2002/0157522 | A1 | | 10/2002 | Cliff | |
| 2003/0183964 | A1 | | 10/2003 | Daskalon et al. | |

(Continued)

FOREIGN PATENT DOCUMENTS

WO    0120609 A2    3/2001

OTHER PUBLICATIONS

Meinard Muller, et al: Audio Matching Via Chroma-Based Statistical Features, ISMIR 2005, {Online} University of London, Sep. 15, 2005, pp. 288-294.

(Continued)

*Primary Examiner* — Brian Albertalli (57) ABSTRACT

A method and apparatus for processing audio for playback to provide a smooth transition between a beginning region of an audio track and an end region of a previous audio track is disclosed. A quantity representative of a chromagram is calculated for each of the audio tracks and the mixing points for the beginning and end regions of each audio track are identified. A quantity representative of a chromagram at the mixing point of the beginning region of the audio track and a quantity representative of a chromagram at the mixing point of the end region of the previous audio track are correlated to determine an order of audio tracks for playback and/or to determine the duration of the mix transition.

9 Claims, 4 Drawing Sheets

U.S. PATENT DOCUMENTS

2003/0205124 A1* 11/2003 Foote et al. .................. 84/608
2003/0210533 A1   11/2003 Baek et al.

OTHER PUBLICATIONS

Steffen Pauws, Musical Key Extraction From Audio, {Online} Philips Research Lab Eindhoven, 2004.

Ning Hu, et al: Polyphonic Audio Matching and Alignment for Music Retrieval, {Online} IEEE Workshop on Applications of Signal Processing to Audio Acoustics, Oct. 19-22, 2003, New Paltz, NY.

* cited by examiner

METHOD AND APPARATUS FOR PROCESSING AUDIO FOR PLAYBACK

FIELD OF THE INVENTION

The present invention relates to a method and apparatus for processing audio for playback. In particular, it relates to playback of audio in which a smooth transition is provided between successive pieces of audio.

BACKGROUND OF THE INVENTION

As a result of advances in audio compression, availability of broadband Internet access at home and the popularity of electronic music distribution systems, users can now acquire and store ever-increasing number of audio files in their local databases. Moreover, consumer-devices with mass random-access storage and sophisticated rendering capabilities make the whole electronic music database available for instant playback. As opposed to traditional music playback where only a limited number of songs are manually selected, there is a strong need for intelligent playlist generation techniques that utilize the whole database while taking the user's interests into account. Moreover, it is desirable to present these songs in a seamlessly streaming manner with smooth transitions. Automatic audio mixing and playback systems which provide smooth transitions between songs are known and commonly referred to as AutoDJ.

An AutoDJ is a software function in a consumer hardware platform that has "knowledge" of music and can thus choose and mix songs from a given database. AutoDJ is not a tool that is used by human DJs to perform audio mixing, it is rather a replacement for the human DJ and operates with minimal intervention.

An AutoDJ does not provide mere crossfade transitions but is capable of applying different types of transitions depending on the audio content and the user preferences. An AutoDJ can be divided into two parts: (1) generating playlists, sorting songs according to their degree of likeness, i.e., it has some "knowledge of music"; and (2) mixing consecutive songs and playing the mix. Mixing the songs includes the steps of computing the type and size of the transition, determining the exact mixing points and playing the music. Such AutoDJ systems offer complex sound processing functionality to realize various transitions between consecutive tracks (e.g. equalization of tempo and synchronization of beat phase) as well as analysis of consecutive tracks. It determines a transition based on straightforward criteria, then executes the transition.

There are a number of existing products that perform automatic audio mixing, for example Bpm DJ and DJ Mix Pro. Bpm DJ is a closed system where predefined playlists are mixed at live events. The predefined mixes are based on different genres. For examples choice include South Dakota wedding SJ mix, a Sioux Falls, Brookings mix, Chamberlain mix, or Watertown event mix or prom, school dance, party etc. These are all based on a known database and playlists. However, this approach requires a prior knowledge of the songs and will only operate with predefined collection of songs. DJ Mix Pro provides more flexibility in its choice of playlist and performs beat mixing based on the input playlist to a certain extent. However, it lacks the ability to determine important song semantics such as phrase boundaries. Automatically mixing songs to create seamless transitions between two songs is also disclosed in US2003/0183964. A drawback of the known automatic mixing methods is that the created mix transitions are often short or of poor quality.

SUMMARY OF THE INVENTION

Therefore, it is desirable to provide a simple and effective system for automatically selecting, ordering and mixing consecutive music tracks in a playlist to create (almost) seamless transitions. Further, it is desirable to provide an AutoDJ which can make use of the whole database available to provide diverse playlists in which the order of playback can be optimised to provide a smooth transition between the audio tracks. A music track is a piece of audio, for example, a song which may be stored in a digital format for subsequent playback.

In particular, this is achieved according to a first aspect of the present invention by a method for processing audio for playback to provide a smooth transition between a beginning region of an audio track and an end region of a previous audio track, the method comprising the steps of: correlating a quantity representative of a chromagram at a mixing point of said beginning region of said audio track and a quantity representative of a chromagram at a mixing point of said end region of said previous audio track; and smoothing the transition between the successive audio tracks during playback at the mixing points of said beginning region of said audio track and said end region of said previous audio track on the basis of a correlation between the quantities representative of the chromagrams. A quantity representative of a chromagram may be the chromagram itself or one or more values derived from the chromagram.

This is also achieved according to a second aspect of the present invention by an apparatus for processing audio for playback to provide a smooth transition between a beginning region of an audio track and an end region of a previous audio track, the apparatus comprising: a correlator for correlating a quantity representative of a chromagram at a mixing point of said beginning region of said audio track and a quantity representative of a chromagram at a mixing point of said end region of said previous audio track; and smoothing the transition between the successive audio tracks during playback at the mixing points of said beginning region of said audio track and said end region of said previous audio track on the basis of a correlation between the quantities representative of the chromagrams.

Chromagrams have turned out to be very useful for creating smooth mixes of audio tracks. The system can work with any collection of audio with any prior knowledge of the songs.

Chromagrams can be used to select and sort audio recordings in a playlist in such a way that each pair of successive recordings have similar harmonic or chordal contexts at their mixing points. Such an optimal arrangement of audio recordings may be achieved by finding the maximum correlation between the chromagrams of the mixing points of any two successive audio recordings in a playlist.

Preferably, a plurality of audio tracks are selected for playback in an order based on the correlation of the chromagrams of the beginning and end regions of successive audio tracks. More preferably the order of playback is determined to optimise correlation of the chromagrams of the beginning and end regions of successive audio tracks.

The order of the playlist may be determined on the basis of a local search method wherein the penalty as to whether a sequence of audio tracks meets predefined constraints is calculated; and the sequence of audio tracks which has the least penalty is derived iteratively. The penalty may be calculated on the basis of the correlation between the chromagrams of the audio tracks.

Additionally or alternatively, the duration of the mixed transition between successive audio tracks may be determined on the basis of the correlation of the chromagrams of the beginning and end regions of said successive audio tracks.

In a preferred embodiment of the present invention, the chromagrams are computed by harmonically compressing the amplitude FFT-based spectral of the content of each audio track over a predetermined number of octaves. The number of octaves may be six. Then the harmonically compressed amplitude spectrum of each audio track are filtered by multiplying the spectrum by a Hamming window. The values of the amplitude spectrum are extracted at and around the spectral peaks.

A chromagram is an encoding of the likelihood of all 12 chromas in music audio. A chroma is a scale position category of a note, represented by the note name (e.g., 'C', 'C#', 'D', . . . ), disregarding its octave. So, two pitches that are an octave apart, share the same chroma but differ in pitch height. Chroma is thus cyclic in nature by octave periodicity. In this way, the chromagram summarizes the harmonic/chordal content of a music sample in a very compact form as a 12-element feature vector.

Music that is composed in a particular key or that uses a particular chordial progression have particular chromas that occur relatively more often; these chromas are found to be more stable. Chromagrams of major keys (or their corresponding major chordial triad) have the highest occurrence for their tonic, and the other two pitches of the triad (major third, perfect fifth), followed by the rest of pitches of the major scale to be concluded by the non-scale pitches. On the other hand, chromagrams of minor keys (or their corresponding minor chordial triad) differ in a lower occurrence for the major third, but in a higher occurrence for the minor third. Chromagrams only depend on the relationship between a pitch and a tonal centre and not on absolute pitches. Consequently, chromagrams for different major or minor keys (chords) are all transpositions of each other. For instance, the chromagram for C major can be shifted six positions to arrive at a chromagram for G major. This makes the Pearson's product moment correlation between chromagrams of two audio samples an excellent candidate for computing the harmonic similarity between the two audio samples.

BRIEF DESCRIPTION OF DRAWINGS

For a more complete understanding of the present invention, reference is made to the following description taken in conjunction with the accompanying drawings, in which.

DETAILED DESCRIPTION OF PREFERRED EMBODIMENTS

Figure 1:
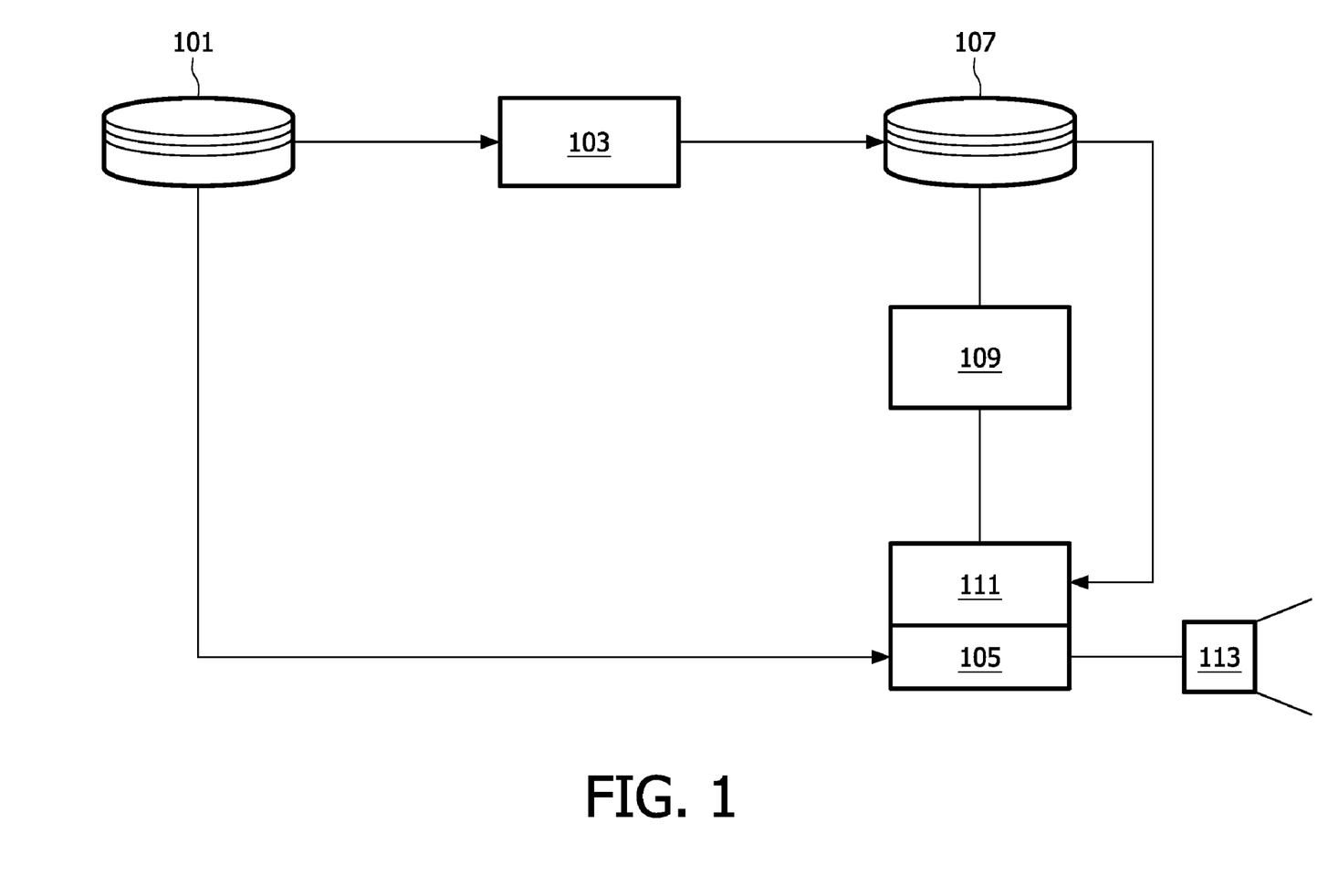
FIG. 1 is a simple schematic of a known automatic DJ system.

A basic schematic of a known AutoDJ is shown in FIG. 1. It comprises a song database 101 which outputs songs to a content analyzer 103 and a player 105. The content analyzer 103 analyzes the songs stored in the database 103 to extract parameters that represent the rhythmical and perceptual properties of the content. These include, among other things, song segmentation parameters, tempo and beat locations (onsets), harmonic signature, etc. These parameters (collectively referred to as AutoDJ meta-information) are conveniently computed offline and stored in or added to a linked feature database 107.

A playlist generator 109 is fed user preferences and using the database 101 creates a suitable playlist. Given, such a playlist, a transition planner 111 compares the AutoDJ meta-information corresponding to the songs in the playlist and decides the optimal order of play and generates a set of commands to be executed by the player 105. Finally, the player 105 streams the songs from the database 101 into the output-rendering device 113 (e.g. loudspeaker) executing the sequence of commands dictating how the songs should be mixed and played back in a rhythmically consistent and smooth way.

In order to perform seamless song transitions, it is a prerequisite that songs that will be played successfully in a mix have musically similar properties at their mixing points. Therefore, the selection of songs and their order in the playlist is important to guarantee music similarity in the mix. Small dissimilar properties in tempo can be corrected by applying music transformation technologies such as time-stretching algorithms. Songs can be mixed by aligning their beat (i.e., the perceived pulse in the music), known as "beat mixing". Songs can also be mixed with respect to similar musical keys (or similar harmonic/chordal context), "harmonic mixing".

There are many known techniques to generate the correct "best" order of songs in a playlist. One of these is known as local search. In this method the user preferences are defined as constraints for the playlist. To generate the "best" fit for the playlist the penalty for violating constraints is minimised. To achieve this, penalty functions are used that express to what extent constraints are satisfied in a numerical value. Local search works in an iterative manner such that a solution (playlist) is found and in each iteration a random, small change is made to this solution. The kind of changes that can be made to a solution are (i) adding a song, (ii) deleting a song, (iii) replacing a song by a new one, and (iv) swapping two songs in the playlist. The penalty for each solution of each iteration is then compared to that of the previous until the minimum penalty is found.

Another known method of generating a suitable playlist in an AutoDJ is use of linear combination Gaussian of kernel functions to model user preferences. The model attempts to learn user preferences by expressing similarities between songs metadata using the kernel functions. Once the AutoDJ is trained, the learned behavior is directly applied to other larger sets of songs. The fundamental assumption is that the metadata consistently summarizes the song it is linked to.

In many cases this is not a valid assumption because the metadata attached to the audio content of the file is arbitrarily filled and does not necessarily represent the behavior of the song. Further, it does not allow beat mixing of songs.

To assist the reader in understanding the principle of the present invention, details of the basics of the mixing process will be described with reference to FIGS. 2 to 4.

Figure 2:
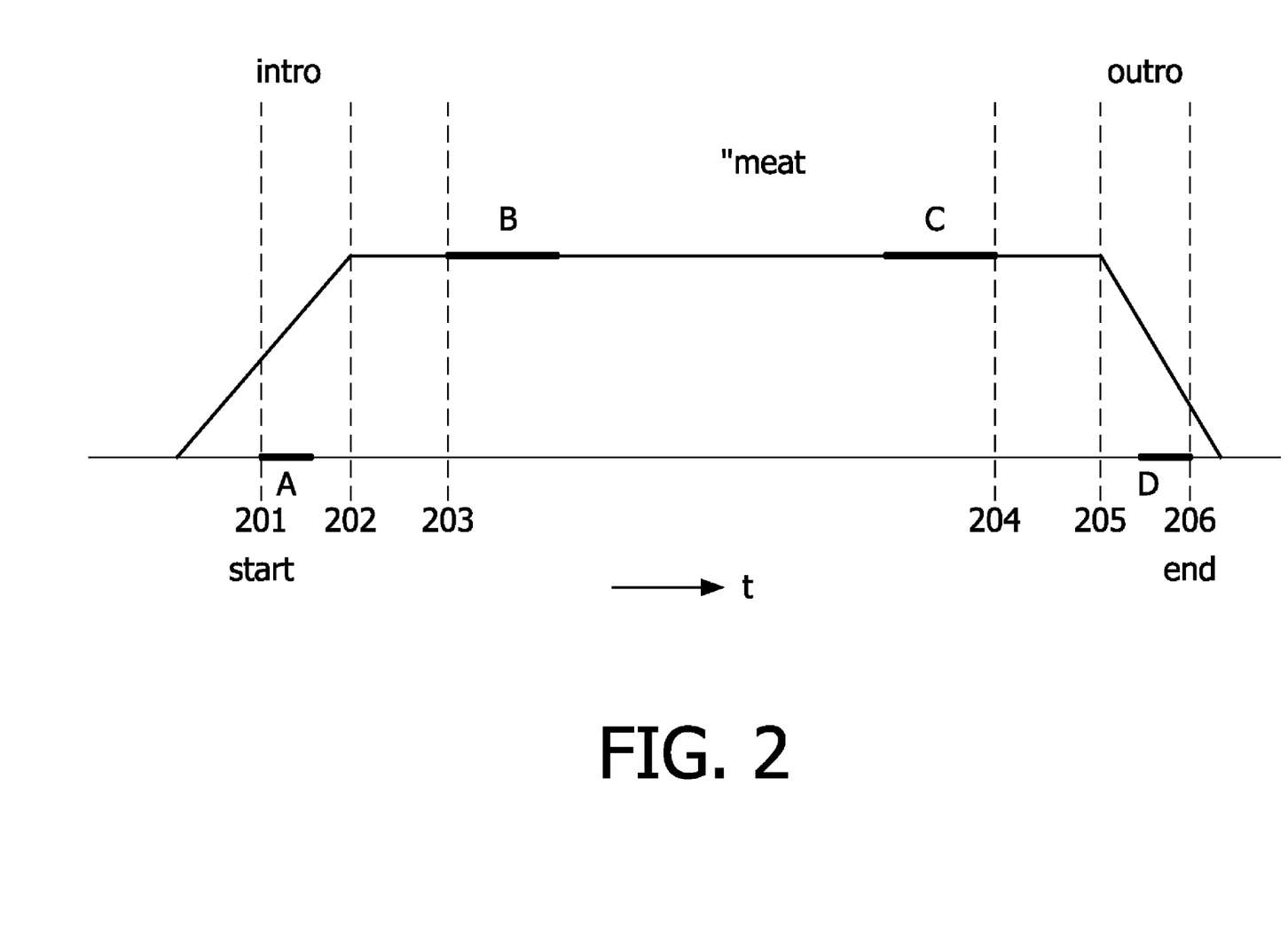
FIG. 2 is a graphical representation of typical mixing materials of an audio track.

FIG. 2 illustrates the typical construction of a music track. The structure of the music track is merely an example and the type of transition to be implemented is dependent on where the mix is applied, or conversely the intervals used can depend on the envisaged type of transition.

As illustrated in FIG. 2, the music track (or song) can be broken down into three main parts, namely, Intro, Meat and Outro. These and several other regions can be defined as follows:

First audible (Fade-in moment) 201. The location at which the track just exceeded the hearing threshold for the first time;

End of Intro 202. This is used for analysis purposes only. It is used as an anchor for the blend-in moment pointer. It reduces the probability that part of the intro is in the beat mix transition;

Blend-in moment 203. This identifies the location of a beat onset that, in case of a beat mix, will be synchronized to the blend-out moment of the previous track in the play list.

Blend-out moment 204. This identifies the location of a beat onset that, in case of a beat mix, will be synchronized to the blend-in of the next track in the play list.

Start of Outro 205. This is used for analysis purposes only. It is used as an anchor for the blend-out moment pointer. It reduces the probability that part of the outro is in the beat mix transition;

Last audible (Fade-out moment) 206. The location at which the track just exceeded the hearing threshold for the last time;

Based on the above delimiters, there are four mix (analysis) areas:

Fade-In Area (area A): Area in which transition type fade-in is applied. It is entirely situated in the intro of the song and extends starting from the Fade-In moment 201. Its actual duration will depend on the characteristics of the preceding song.

Blend-In Area (area B): Region in which beat-mix with the previous song can take place. It is fully in the Meat of the song and extends starting from the Blend-In moment 203. Its exact duration depends on the characteristics of the preceding song.

Blend-out Area (area C): Region in which beat-mix with the next song can take place. It is fully in the Meat of the song and extends up to the Blend-Out moment 204. Its actual duration will depend on the characteristics of the next song.

Fade-Out Area (area D): Area in which transition type fade-out is applied. It is entirely in the outro part of the song and extends up to the Fade-out moment 206. Its actual duration will depend on the characteristics of the next song.

For each Analysis area, AutoDJ meta-information is stored in a database. Outside these regions, a fancy mix can be implemented if real-time computation of meta-information for an arbitrary region is possible. When the meta-information is not available, the AutoDJ of the preferred embodiment could utilize a simple CD-style transition.

The first step in the AutoDJ system according to an embodiment of the present invention is to extract signal features that enable automatic selection and sorting of contents. To this end, two categories of AutoDJ features are identified, namely, the set of features that are necessary to make artistically consistent mixes (referred to as playlist features) and the set of features that are necessary to perform rhythmically consistent mixes (referred to as rhythmical features).

The playlist features are sets of features that are used to construct a meaningful (artistically consistent) collection of songs satisfying user criteria. Playlist generation can be commenced based on metadata delivered along with the records. Such metadata is in most cases manually compiled and is based on some intuitive knowledge of the circumstances of the song such as genre of the artist. Commonly provided metadata include publication year, artist name, genre tag etc. The metadata based playlist generation method basically assumes that the compiled metadata correctly describes the song it is linked to. This assumption is however very unlikely to be fulfilled because the metadata attached to ripped contents are in most cases arbitrarily filled and do not necessary represent the behavior of the song. Thus, the link between song feature and metadata could lead to a flawed model.

Another way of generating playlists is based on low-level features that are extracted using some signal processing tools to automatically generate metadata from the content itself. This allows classification of the songs. This has the advantage that song similarities are measured using objective quantities and thus has the potential of resulting in a consistent model. Two approaches for playlist generation are utilized: classification based approach and similarity measure based approach. In the first approach, a set of features are first extracted and subsequently based on these features. A model is derived and trained to perform classification and automatic labeling of songs. Once the songs are labeled, the metadata is used to generate a playlist for mixing. As mentioned above one known method is local search. The second approach is based on the similarity of songs based on a certain objective distance measure. The idea here is, given an objective distance measure and a "seed" song, similar songs are collected and sorted based on their degree of likeness.

Rhythmical features are obvious song features that are easy to model. These are generally clear objective concepts such as tempo, beat phase, meter and phrase boundary etc. In song semantics, at the lowest level, there are beats of songs, in which each consecutive beat is separated by a beat period. The frequency of beats is referred to as the tempo of the song. A set of beats form the meter of a song. The number of beats per meter depends on the genre of the song. In dance music for example there are four beats per meter. On a higher abstraction level, there is the phrase of a song. This is generally a collection of four meters and usually coincides with a start of the vocal phrase in a song. In the art of song mixing, the human DJ always tries to align phrase boundaries of songs to be mixed. In this way a rhythmic sound mix is created. However, phrase detection and alignment require a deeper music feel and are often difficult to model. In such cases, meter-aligned beat mixing could be sufficient. Generally, phrase alignment is ideal, meter alignment is workable and beat alignment is not sufficient for rhythmically acceptable music mixing.

Figure 3:
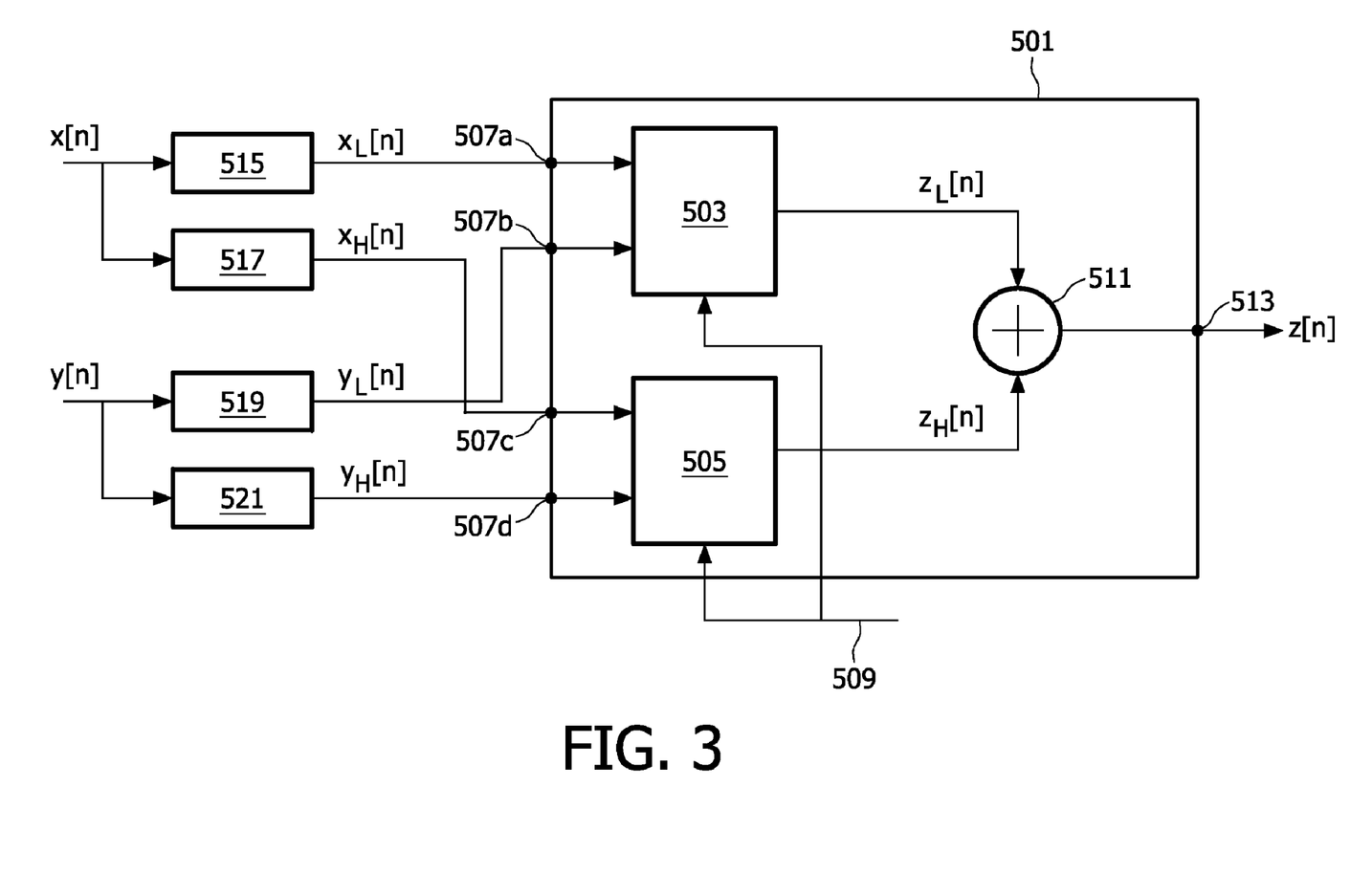
FIG. 3 is a simple schematic of an AutoDJ system according to an embodiment of the present invention.

An AutoDJ according to an embodiment of the present invention is shown in FIG. 3.

The AutoDJ 501 comprises a first mixer 503 and a second mixer 505. The pair of input terminals of each mixer are connected to respective input terminals 507a, 507b, 507c, 507d of the AutoDJ 501. Each mixer 503 and 505 are connected to a control terminal 509 of the AutoDJ 501. The outputs of each mixer 503, 505 is connected to respective inputs of an adder 511. The output of the adder 511 is connected to the output terminal 513 of the AutoDJ 501.

A first pair of input terminals 507a, 507b, are connected to the output of a first low-pass filter 515 and a second low-pass filter 519. A second pair of input terminals 507c, 507d are connected to the output of a first high-pass filter 517 and a second high-pass filter 521.

During the transition period, the first low pass filter 515 and first high pass filters 517, decompose the first input signal x[n] into two complementary components $x_L[n]$ and $x_H[n]$, the second low pass filter 519 and the second high pass filter 521 decompose the second input signal y[n] into its two complementary components and $y_L[n]$ and $y_H[n]$, respectively. Preferably, these are the low frequency (bass) and the high frequency (treble) components. Subsequently, the first mixer 503 is applied to mix the corresponding frequency components of the two signals $x_L[n]$ and $y_L[n]$. The second mixer 505 is applied to mix the corresponding frequency components of the two signals $x_H[n]$ and $y_H[n]$. The transition profiles of the first and second mixers 503, 505 is similar to that shown in FIG. 4.

The outputs $z_L[n]$ and $z_H[n]$ of the mixers 503, 505 are then summed up by the adder 511 to generate the output mixed signal z[n] which is output on the output terminal 513 of the AutoDJ 501. The control signal input on the control terminal 509 of the AutoDJ 501 dictates how the mixing in the two mixers 503, 505 is performed and contains information of the location of the mixing points and the size of the overlap.

In principle, multiple frequency bands each with its own transition profile can be chosen. Moreover, the transition profile in each frequency band can vary from zero overlap to very large overlap.

Figure 4:
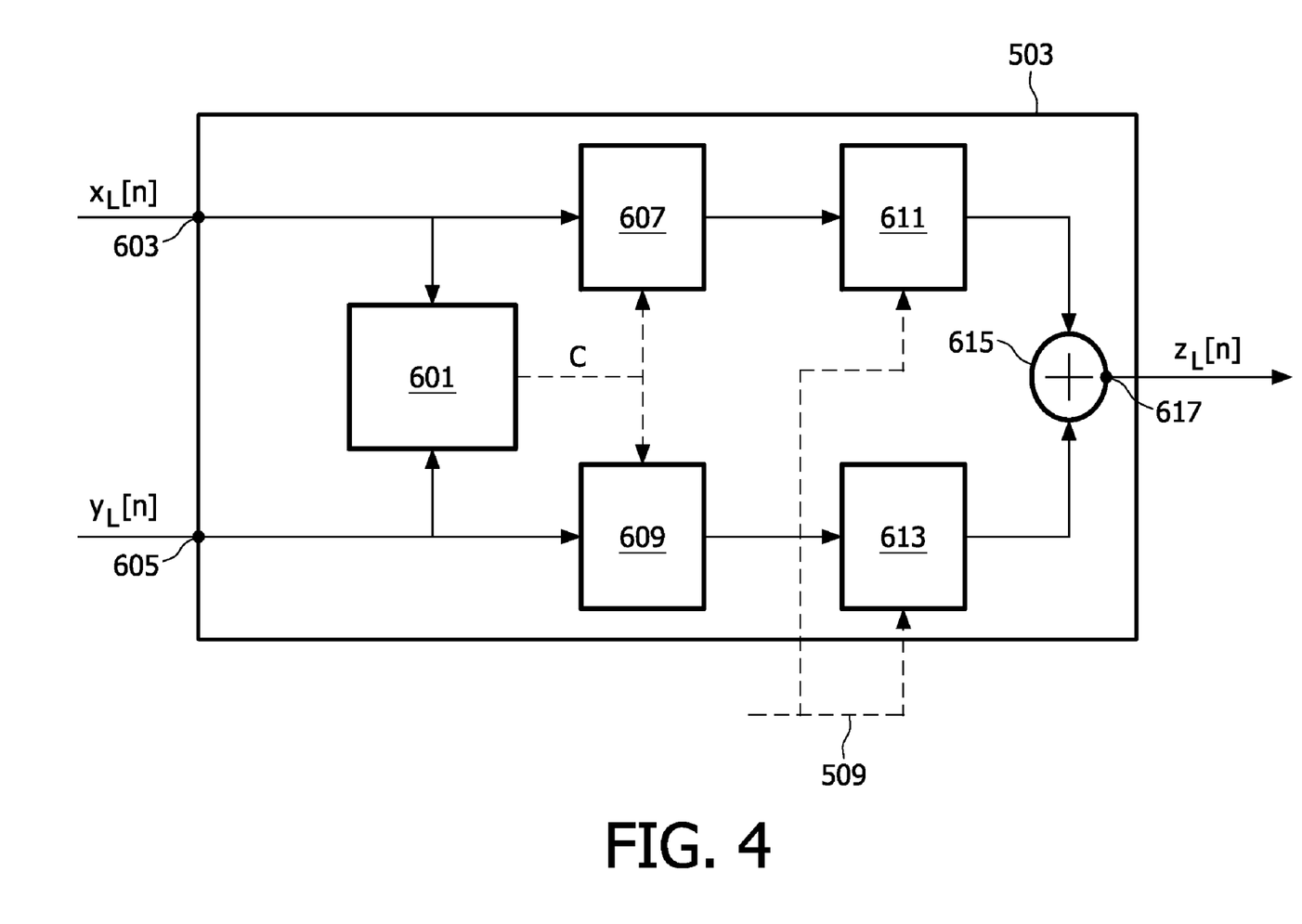
FIG. 4 is a simple schematic of a mixer of the AutoDJ system of FIG. 3.

A more detailed description of the mixers 503, 505 is provided with reference to FIG. 4. It is understood that the first and second mixer 503, 505 may be substantially similar and for simplicity only the first mixer 503 is shown and described here.

The first mixer 503 comprises a phase comparator 601. The inputs of the phase comparator 601 are connected to the input terminals 603, 605 of the mixer 503. The input terminals 603, 605 of the mixer 503 are also connected to the input of respective first and second delay elements 607, 609. The delay elements 607, 609 are controlled by a control signal C generated by the phase comparator 601. The output of the first delay element 607 is connected to the input a first gain element 611. The output of the second delay element 609 is connected to the input of a second gain element 613. The outputs of the first and second gain elements 611, 613 are connected to respective inputs of an adder 615. The output of the adder 615 is connected to the output terminal 617 of the mixer 503.

The input signals $x_L[n]$ and $y_L[n]$ are placed on the input terminals 603 and 605 respectively. The phases of $x_L[n]$ and $y_L[n]$ are compared in the phase comparator 601. The output of the comparator 601 is a control signal C that controls the delay elements 607, 609 so as to minimize the phase conflict during addition. To prevent audible artifacts, the delay elements 607, 609 are changed in a graceful way. The gain elements 611, 613 implement a cross fading profile. In this way the issue of the phase conflicts, in this case, the bass components of the signals to be mixed is compensated.

The gain of the gain elements 611, 613 is controlled by the control signal input on the control terminal 509 of the AutoDJ 501.

One important feature that a human DJ takes into account when preparing the mix is the similarity of the musical-keys of the songs to be mixed. For instance, it would be more difficult to mix C-major with F-sharp minor. In signal processing, the musical-key of a song is represented by the so-called chromagram of the song. Chromagram is an abstraction of the time-varying spectrum of the audio signal based on the perceptual organization of pitch, where the highly redundant octave relationships are discounted and emphasis is given to the pitch structure. Chromagram is a representation of the musical-key of a song and is based on the frequency-to-key mapping shown in Table 1.

TABLE 1

| | Key | | | | | | | | | | | |
|---|---|---|---|---|---|---|---|---|---|---|---|---|
| | C | C# | D | D# | E | F | F# | G | G# | A | A# | B |
| Index | 0 | 1 | 2 | 3 | 4 | 5 | 6 | 7 | 8 | 9 | 10 | 11 |
| Frequency (Hz) | 8.18 | 8.66 | 9.18 | 9.72 | 10.30 | 10.91 | 11.56 | 12.25 | 12.98 | 13.75 | 14.57 | 15.43 |
| | 16.35 | 17.32 | 18.35 | 19.45 | 20.60 | 21.83 | 23.12 | 24.50 | 25.96 | 27.50 | 29.14 | 30.87 |
| | 32.70 | 34.65 | 36.71 | 38.89 | 41.20 | 43.65 | 46.25 | 49.00 | 51.9 | 55.00 | 58.27 | 61.74 |
| | 65.41 | 69.30 | 73.42 | 77.78 | 82.41 | 87.31 | 92.50 | 98.00 | 103.83 | 110.00 | 116.54 | 123.47 |

The chromagram of a song is computed by taking the normalized cumulative energy of the signal for the 12 octave bins in the frequency range 0 to 20 kHz. To be more specific, let x(f) be the frequency response of the audio signal, and $f_{kj1}$ and $f_{kj2}$ represent the lower and upper bounds for the j-th frequency range in the k-th octave bin. $f_{kj1}$ and $f_{kj2}$ are such that the width of each spectral region is a half semitone around the centre frequency given in table 1. Then the k-th chromagram value $\mu_k$ is given by $$\mu_k = \sum_j \frac{1}{(f_{kj2} - f_{kj1})} \int_{f_{kj1}}^{f_{kj2}} |x(f)|^2 d_f$$

The chromagram x of a song W is the histogram constructed by collecting the 12 chromagram values into a single vector, namely $$x = [\mu_0 \mu_1 \mu_2 \ldots \mu_{11}]$$

In the AutoDJ system according to the embodiment of the present invention, the duration of the mix (the size of the overlap) is proportional to the similarity between the chromagrams of the two songs to be mixed. The similarity between the two chromagrams is defined by the Pearson product moment correlation p(x,y) of two chromagram vectors x,y as:

$$p(x,y) = -(p(x,y)-1)/2$$

in which x and y represent chromagram vector of size M (=12), the p(x,y) is the Pearson product moment correlation is given as:

$$p(x, y) = \frac{\sum xy - \frac{\sum x \sum y}{M}}{\sqrt{\left(\sum x^2 - \frac{\sum x^2}{M}\right)\left(\sum y^2 - \frac{\sum y^2}{M}\right)}}$$

The Pearson correlation falls in the interval [−1, 1], where a value of 1 indicates complete correspondence, a value of 0 indicate no correspondence and a value of −1 indicates completely opposite correspondence. Given p(x,y), the duration of the mix is computed using the relation $$\Delta = K p(x,y) + \theta,$$

where θ is the minimum overlap allowed and is usually equal to the beat period of the outgoing song. K is a constant which maps the correlations value into time duration. K is typically measured in terms of beats and may have a value in the range of 16-32 beats (i.e. a maximum overlap of 1 to 2 phrases).

When the chromagrams of the songs to be mixed are far apart, the mix interval is short and a less pleasant mix may be generated.

To overcome this problem, it may be desirable to bridge the two contents with artificially generated transition pattern. This pattern is generally a percussion pattern, which can fit to any chromagram. The percussion pattern is referred to as a uni-key signal as it has a more or less flat spectrum with respect to the octave bins and thus gives almost a constant correlation value with all kinds of songs. Given songs with chromagram mismatch, artificial patterns are inserted between the two songs to enable a smoother transition.

Assuming song A and song B have mismatching musical keys, the artificially generated transition pattern is used to bridge this mismatch. The percussion pattern could be designed in such a way that its chromagram gradually transits from close to song A to close to song B or it could be chosen to have uni-key as discussed above. Apart from chromagram, an artificial pattern can also be used to match very different tempos and songs with entirely different styles. The latter could for instance be achieved by introducing sound effects such as breaks between the songs to be mixed.

In the preferred embodiment, the AutoDJ meta-information is derived from a database of songs. For each analysis, the AutoDJ meta-information, namely, tempo and beat onsets, bar boundaries, beat strengths, spectral shape parameters (chromagram) are computed offline and stored in a linked database as described above with reference to FIG. 1. Besides, other (so-called non-AutoDJ) meta-information such as genre, era, artist and low-level features that are used for objective likeness measure (referred to as likeness-parameters) are also gathered. Although the AutoDJ determines the optimal transition between any two songs (ranging from a long blend to a pause mix), playlists become more attractive when constraints regarding non-AutoDJ meta-information are also used and satisfied. An application that uses AutoDJ meta-information and likeness-parameters in several weighed combinations was made to provide a playlist, starting from a user-supplied seed song. Two "preset" user preferences are implemented; either the playlist contains as many synchronized mixes as possible, or the play list contains tracks that consecutively match optimally regarding their harmonic signature.

The automatically generated playlists are fed to a transition planner that analyzes the AutoDJ meta-information of the analysis areas that are used in each transition. From this analysis, it determines the preferred type of transition and the parameters required to perform it. The generated sets of commands are then executed by the player to perform the required mixes.

A preferred technique to optimise the order of songs in a playlist to provide the required smooth transitions is use of a local search based method. In this method, harmonic similarity can be modelled as a binary constraint between two (successive) positions i and j=(i+1) in a playlist consisting of a sequence of songs $S=s_1 s_2 \ldots s_N$ of length N, as $$HarmonicSimilar(i, j) \equiv 1 \le i \ne j \le N, s_i \cdot x \approx s_j \cdot y \text{ holds}$$

where $s_i.x$ represents the chromagram at mixing point x of song $s_i$. The mixing point may, for example, comprise the outro and the intro (say, the last and first 10 seconds) of two successive songs. To implement the local search, the approximation above between chromagrams has to be further operationalised into a penalty function. This penalty functions tells how well one chromagram approximates to the other in a numerical value ranging from 0 to 1.

Since the whole playlist has to be optimally ordered with respect to harmonic similarity it is necessary find a sequence of songs $s_1 s_2 \ldots s_N$ in which the sum of all penalty functions P* is minimized, i.e., $$P^* = \operatorname{argmin}_{s_1 s_2 \ldots s_N} \sum_{i=1}^{N-1} p(s_i \cdot x, s_{i+1} \cdot y)$$

Obviously, the problem can also be formulated as a maximization problem.

Firstly, the method of the preferred embodiment of the present invention, is to compute the chromagram for each song (or for each relevant mixing point of each song). Mixing points may be the intros and outros of songs. This computation can be either done off-line or on-line. For speed purposes, however, the computation is preferably carried out off-line.

As mentioned above, the chromagram is defined as the restructuring of a spectral representation in which the frequencies are mapped onto a limited set of 12 chroma values in a many-to-one fashion. This is done by assigning frequencies to the 'bin' that represents the ideal chroma value of the equally tempered scale for that frequency, for example, as shown in Table 1 above. The 'bins' correspond to the twelve chromas in an octave. For the spectral representation, a sum of harmonically compressed amplitude FFT-based spectral is used in which the spectral content above 5 kHz is cut off by down-sampling the signal. It is assumed that harmonics in the higher frequency regions do not contribute significantly to the pitches in the lower frequency regions. Preferably, only a limited number of harmonically compressed spectra (say, 15) are added. The spectral components (i.e., the peaks) are enhanced to cancel out spurious peaks that do not contribute to pitches. Spectral components at higher frequencies contribute less to pitch than spectral components at lower frequencies. The frequency abscissa is transformed to a logarithmic one by means of interpolation, since human pitch perception follows logarithmic laws. In total, 171 points per octave are interpolated over 6 octaves (from 25 Hz to 5 kHz) by a cubic spline method. This is required to achieve a higher resolution for going from the linear to the logarithmic frequency domain and to prevent numerical instability.

A weighting function is used to model the human auditory sensitivity; the perceived loudness of a pitch depends on its frequency. For instance, the loudness of pitches with equal amplitude start to drop steeply at frequencies lower than 400 Hz.

Harmonic compression means that the linear frequency abscissa is multiplied by an integral factor n. In the logarithmic frequency domain, the multiplication is equal to a shaft (or addition). The compression rank n refers to the index of the harmonic that will be resolved. The number of compressions carried out amounts to the number of harmonics that is investigated. All these different compressed spectrum presentations are added; a sequence of decreasing factors is used to realise that higher harmonics contribute less to pitch than the lower harmonics do.

From an algorithmic point of view, the input signal is partitioned in non-overlapping time frames of 100 milliseconds. If the signal is in stereo format, a mono version is created by averaging both channels first. The length of a frame is inspired, on one hand, by the minimal duration of a note in a music performance with a usable global tempo (30-300 bpm; or between 5 events per second and 1 event every 2 seconds) and, on the other hand, by the fact that long frames are computationally too intensive.

Since further processing considers only the musical pitches from A0 (27.5 Hz) to A6 (1760.0 Hz), the harmonic compression is done over 6 octaves from 25 Hz until 5 kHz, also to capture some harmonics of the higher pitch frequencies. So, spectral content at frequencies greater than 5 kHz will not be taken into account. A low-pass filtering of at least 10 kHz and a decimation process bandlimnits and downsamples the signal by a particular factor. Low-pass filtering is down by a FIR approximation of an ideal low-pass filter. This down-sampling decreases dramatically the computing time necessities without affecting results seriously. The 'remaining' samples in a frame are multiplied by a Hamming window, zero-padded, and the amplitude spectrum is calculated from a 1024-point FFT. This spectrum consists of 512 points spaced 4.88 Hz on a linear frequency scale. Next, a procedure is applied aiming at enhancing the peaks without seriously affecting frequencies or their magnitudes. Only values at and around the spectral peaks are taking into account by setting all values at points that are more than two FFT points (9.77 Hz) separated from a relative maximum, equal to 0. The resulting spectrum is then smoothed using a Hanning filter.

Since a linear resolution of 4.88 Hz is far too limited for the lower pitch regions (the pitch frequency difference between C2 and C#2 is 3.89 Hz), the values of the spectrum on a logarithmic frequency scale are calculated for values of the spectrum on a logarithmic frequency scale are calculated for 171 (interpolation). The interpolated spectrum is multiplied by a raised arctangent function, mimicking the sensitivity of the human auditory system for frequencies below 1250 Hz. The result is shifted along the logarithmic frequency scale, multiplied by a decreasing factor h and added for all harmonics to be resolved (N=15) resulting in the harmonically compressed spectrum defined over at least six octaves.

The chromagram for each frame is computed by locating the spectral regions in the harmonically compressed spectrum that correspond with each chroma in equal temperament. For the pitch class C, this comes down to the four spectral regions centred around the pitch frequencies for C1 (32.7 Hz), C2 (65.4 Hz), C3 (130.8 Hz), C4 (261.6 Hz), C5 (523.3 Hz) and C6 (1046.5 Hz). The width of each spectral region is a half semitone from this centre. The amplitudes in all four spectral regions are added to form one chroma region. Then, the norm H of the amplitudes that fall within a chroma region and the norm R of all amplitudes that do not fall within a chroma region are taken. Calculating the quotient $$\frac{H}{R}$$

provides the likelihood of that chroma. Adding and normalizing the chromagrams over all frames results in a chromagram for the complete music sample.

Although the preferred embodiment refers to a specific correlation technique to correlate the chromagrams at the mixing points, it can be appreciated that the present invention is not limited to such a technique and that it is intended that the correlation of the chromagrams at the mixing points includes any other associative or distance measure such as chi-square distance, euclidean distance, entropy measure, distribution measure or the like.

Although a preferred embodiment of the present invention has been illustrated in the accompanying drawings and described in the foregoing detailed description, it will be understood that the invention is not limited to the embodiment disclosed but is capable of numerous modifications without departing from the scope of the invention as set out in the following claims.

The invention claimed is:

1. A method for processing audio for playback to provide a smooth transition between a beginning region of an audio track and an end region of a previous audio track, the method comprising the steps of:
   determining, using a content analyzer, a chromagram for said audio track and a chromagram for said previous audio track;
   correlating, using a correlator, a quantity representative of the chromagram at a mixing point of said beginning region of said audio track and a quantity representative of the chromagram at a mixing point of said end region of said previous audio track; and
   smoothing, using controllable delay elements, the transition between the successive audio tracks during playback at the mixing points of said beginning region of said audio track and said end region of said previous audio track on the basis of a correlation between the quantities representative of the chromagrams.

2. The method as claimed in claim 1, wherein the step of smoothing the transition between the successive audio tracks comprises:
   determining an order in which the audio track and the previous audio track are played back on the basis of a correlation between the quantities representative of the chromagrams.

3. The method as claimed in claim 2, wherein the order of playback is determined by optimizing correlation between the quantities representative of the chromagrams of said beginning and end regions of successive audio tracks.

4. The method as claimed in claim 2, wherein the step of determining the order comprises the steps of:
   Calculating, using the correlator, a penalty as to whether a sequence of audio tracks meets predefined constraints, the penalty being calculated on the basis of the correlation between quantities representative of the chromagrams of the audio tracks; and
   iteratively deriving the sequence of audio tracks which has the least penalty.

5. The method as claimed in claim 1, wherein a duration of a mixed transition between successive audio tracks is determined on the basis of said correlation between the quantities representative of the chromagrams of said beginning and end regions of said successive audio tracks.

6. A non-transitory computer-readable storage medium having stored therein a computer program comprising a plurality of program code portions for causing a computer, when executing the computer program, to carry out the method as claimed in claim 1.

7. An apparatus for processing audio for playback to provide a smooth transition between a beginning region of an audio track and an end region of a previous audio track, the apparatus comprising:
   a correlator for correlating a quantity representative of a chromagram at a mixing point of said beginning region of said audio track and a quantity representative of a chromagram at a mixing point of said end region of said previous audio track; and controllable delay elements for smoothing a transition between the successive audio tracks during playback at the mixing points of said beginning region of said audio track and said end region of said previous audio track, said controllable delay elements being controlled on the basis of a correlation between the quantities representative of the chromagrams.

8. The apparatus as claimed in claim 7, wherein the apparatus further comprises:
a playlist generator for selecting a plurality of audio tracks for playback in an order based on said correlation between the quantities representative of the chromagrams of said beginning and end region of successive audio tracks in the playlist.

9. The apparatus as claimed in claim 7, wherein said apparatus further comprises:
a transition duration determiner for determining a duration of the mixed transition between successive audio tracks on the basis of said correlation between the quantities representative of the chromagrams of said beginning and end regions of said successive audio tracks.

* * * * *